Patented Nov. 18, 1952

2,618,583

UNITED STATES PATENT OFFICE 2,618,583

ACARICIDES

Everett E. Gilbert, Flushing, N. Y., assignor to Allied Chemical & Dye Corporation, New York, N. Y., a corporation of New York No Drawing. Application August 9, 1949, Serial No. 109,419

17 Claims. (Cl. 167—30)

This invention relates to the control of mites, and more particularly concerns the provision of agents or acaricides for controlling mites and the method of applying such agents or acaricides for this purpose.

The problem of mite control for protection of plants and foliage has assumed increasing importance, particularly in view of the current widespread use of DDT (p,p'-dichlorodiphenyl 1,1,1-trichloroethane) as an insecticide. Some effective insecticides do not necessarily have acaricidal or miticidal activity, and in fact many insecticides are of no value at all as acaricides. Thus, for instance, while DDT is a very effective insecticide, it not only is ineffective in exterminating mites such as the two-spotted spider mite (greenhouse red spider mite) and the European red mite, but promotes their growth, reproduction and development by destroying the mite predators. Illustrative of the extensive damage caused by mites, it is known that almost every type of greenhouse plant is subject to attack and injury by the so-called two-spotted spider mite and apple tree foliage suffers particularly from the ravages of both the two-spotted mite and the European red mite.

Although various acaricides have been prepared and placed on the market to deal with this problem, and in a few cases have proved successful in combatting mites, the presently available proprietary acaricides are open to various objections. Thus, some of them are quite toxic to animals and humans, while some suffer from the disadvantage of possessing high phytotoxicity or tendency to injure plants and foliage, especially under warm weather conditions and at high dosages. Further, certain of the more recent acaricides have been found too difficult and expensive to manufacture to warrant widespread acceptance.

A principal object of the invention is to control mite injury to plants. Another object is the provision of economical agents or compositions effective for control of mites while being relatively non-toxic to animals and humans and substantially non-phytotoxic to the plants or foliage to be treated. A further object is to afford procedure for control of mite population utilizing readily available agents or compositions.

Other objects and advantages will be apparent as the description of the invention proceeds.

I have discovered that surprisingly good results in controlling mites are obtained by subjecting the mites to the action of a compound of the general formula RSO2OR', wherein R denotes an aromatic radical selected from the group consisting of phenyl and tolyl, and R' denotes chlorinated phenyl. The toxicants of the invention are thus noted to comprise certain chlorinated esters of a monohydric phenol and a benzene sulfonic acid.

The use of these compounds as acaricides in accordance with the invention brings about good to almost complete freedom of the plants treated from the ravages of mites, particularly the two-spotted spider mite and the European red mite. In addition to effecting kill of adults and nymphs in all stages of development, particularly when applied as sprays or dusts, I have found the toxicants of the invention are frequently effective also as ovicides. Further, the invention compounds are substantially non-phytotoxic and their application enables the foliage of the treated host to be maintained in a more green and vigorous condition throughout the growing season.

The expression "plants" is intended herein to denote any form of plant life or vegetation, including, for example, trees, flowers, vegetable plants and the like.

Representative examples of chlorinated phenyl esters of a benzene sulfonic acid within the scope of the invention which have been tried and found effective for control of mites include the following:

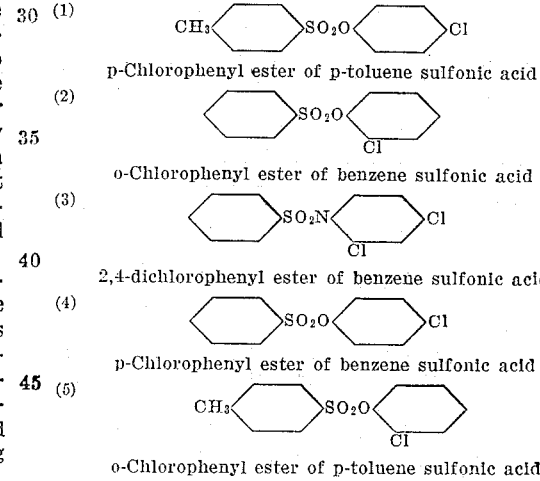

(1) p-Chlorophenyl ester of p-toluene sulfonic acid (2) o-Chlorophenyl ester of benzene sulfonic acid (3) 2,4-dichlorophenyl ester of benzene sulfonic acid (4) p-Chlorophenyl ester of benzene sulfonic acid (5) o-Chlorophenyl ester of p-toluene sulfonic acid The compounds or toxic agents of the invention may be utilized either alone or as mixtures of two or more thereof. The preferred toxicant is compound (3), the 2,4-dichlorophenyl ester of benzene sulfonic acid.

The above compounds may be prepared in known manner by the reaction of the particular phenol with the corresponding benzene sulfonyl chloride in the presence of a base. Thus, for example, the 2,4-dichlorophenyl ester of benzene sulfonic acid may be prepared by reacting 2,4-dichlorophenol with benzene sulfonyl chloride in the presence of aqueous caustic soda. In the more usual circumstances of commercial manufacture of this ester, the final product will also include a small amount of the 2,6-dichlorophenyl ester of benzene sulfonic acid, since technical 2,4-dichlorophenol often contains a small amount of the 2,6-dichlorophenol isomer as an impurity. However, the presence of the small amount of the 2,6 ester in the 2,4-dichlorophenyl ester product does not detract from the acaricidal properties of the latter.

The toxicants of the invention are ordinarily applied as acaricides in conjunction with a carrier which may be a solid, liquid or gaseous material, the invention compounds constituting the essential active ingredients of such compositions. Preferably, the aromatic esters of benzene sulfonic acid hereof are employed either in the form of aqueous sprays or so-called dust compositions, and the amount of toxicant used may vary, a sufficient quantity thereof being utilized to provide the desired toxicity. When employed in the form of a powder or dust, the above compounds or toxicants may be mixed with a substantial proportion of any suitable solid inert material or diluent, preferably in finely divided form, such as known grades of prepared parasiticide carrier clays, pyrophyllite, fuller's earth, bentonite, sulfur, lime, talc, whiting, diatomaceous earth, etc. Suitable dusts of this type may consist, for example, of from 5% to 50% toxicant and from about 95% to 50% clay or diluent. Satisfactory dust compositions should contain not less than 5% and preferably not less than 10% by weight of the active ingredients individually or as mixtures thereof.

Liquid sprays of the toxicants of the invention may be prepared by first forming a solution of the compound in a suitable organic solvent, e. g. xylene, methylated naphthalenes, or any highly aromatic petroleum type insecticide oil, and preferably adding a small amount of wetting or emulsifying agent commonly employed in the art, such as diglycol oleate or the p-isooctyl phenyl ether of polyethylene glycol. The resulting solution concentrate is incorporated with water in quantity sufficient to form an aqueous spray dispersion or emulsion having the desired active ingredient concentration. Such a dispersion or emulsion may be sprayed from any suitable spraying apparatus to form droplets which readily adhere to the plants or foliage being protected and wet the mites which it is desired to control.

Representative sprays may be prepared, for example, by first forming a solution of about 30% to 50% toxicant in about 67% to 47% organic solvent and adding approximately 3% wetting and dispersing agents, and then adding the resulting solution to water. If desired, smaller or larger amounts of such wetting and dispersing agents may be employed. Alternatively, aqueous spray dispersions or suspensions may be formed by incorporating in water dry mixtures or so-called wettable spray powders containing 10% to 60% by weight of active ingredient, the balance comprising inert diluents, suitable quantities of wetting and/or conditioning agents and, if desired, compatible parasiticides. The aqueous spray dispersions of the invention preferably should contain the active ingredient individually or in admixture in amount not less than 1/8 pound per 100 gallons, the more usual concentrations being in the range of 1/4 to 2 pounds per 100 gallons of dispersion, although in some instances higher toxicant concentrations may be employed.

The acaricides if the invention may also be applied by fumigation, especially in greenhouses. Fumigation may be carried out by vaporizing the benzene sulfonic acid esters described above from hot steam pipes located in the greenhouse.

Another method by which the toxicants of the invention may be applied involves formation of aerosol sprays containing such toxicants in solution. In accordance with this method the acaricides of the invention are dispersed in a suitable liquefied gas dispersant, e. g. a chlorofluorohydrocarbon such as dichlorodifluoromethane, and the resulting liquid allowed to escape into the atmosphere through a suitable orifice to form a finely divided suspension of the toxicant which is effective in combatting the mites being treated.

The compounds of the invention may be employed in conjunction with other compatible toxicants or paraciticides, e. g. DDT, benzene hexachloride, pyrethrin and lead arsenate, to control other plant pests simultaneously with the mites sought to be exterminated. Further, the acaricides described herein may be employed in admixture with other known commercial acaricides such as parathion (O,O-diethyl-O-p-nitrophenylthiophosphate). When used in this manner, the toxicants added may also function as diluents for the acaricides of the invention.

The following examples are illustrative of the invention:

*Example 1.*—An emulsible liquid containing 50% of the 2,4-dichlorophenyl ester of benzene sulfonic acid as toxicant, 47% of a mixture of methylated naphthalenes having a boiling range of about 215° to 275° C. as solvent and 3% of the p-isooctyl phenyl ether of polyethylene glycol as emulsifying agent, was added to water to form an aqueous spray dispersion, one quart of the emulsible liquid concentrate, containing about 1 pound of toxicant, being employed per 100 gallons of spray dispersion.

The aqueous spray dispersion was applied to Bartlett pear trees during a period of high temperature (106°–110° F.). After spraying, weekly counts of adult mites of the two-spotted and European red mite species were taken over a period of about 8 weeks. Counts were made by selecting at random 10 mature leaves from the inside and 10 leaves from the outer foliage of each tree. The average counts from 20 such leaves of each of the sprayed trees as compared to the corresponding average counts of 20 leaves selected in the same manner from each of a group of unsprayed check trees are noted below.

| Count periods | Number of adult mites | | | |
| | Sprayed trees | | Check trees | |
| | 2-spotted mite | European red mite | 2-spotted mite | European red mite |
|---|---|---|---|---|
| 1 | 0 | 0 | 0 | 25 |
| 2 | 0 | 0 | 36 | 166 |
| 3 | 0 | 1 | 84 | 215 |
| 4 | 0 | 2 | 63 | 206 |
| 5 | 0 | 2 | 131 | 241 |
| 6 | 0 | 12 | 105 | 291 |
| 7 | 2 | 18 | 30 | 211 |

As seen from the above table, there was no appreciable gain in population of either the two-spotted mite or European red mite during the 8 week period on the leaves of trees sprayed with a material containing the 2,4-dichlorophenyl ester of benzene sulfonic acid as toxicant, whereas mite population on the leaves of the unsprayed check trees markedly increased over this period. Further, during the 8 week period, the sprayed trees exhibited very little leaf drop whereas the check trees were nearly 75% defoliated at the last count due to mite damage. Moreover, practically no burning of the leaves of the sprayed trees was apparent in spite of the high temperature prevailing at the time of application of the spray. The results realized using the 2,4-dichlorophenyl ester of benzene sulfonic acid as an acaricide in the manner noted above were as good as or better than in the case of three commercial acaricides.

*Example 2.*—Cranberry bean plants infested with the two-spotted spider mite were sprayed with an aqueous dispersion containing 1 pound of the 2,4-dichlorophenyl ester of benzene sulfonic acid and about 1 pound of DDT per 100 gallons. Examination of the cranberry bean plants about 1 week after spraying showed excellent kill of all stages of mite development with no evidence of phytotoxicity.

*Example 3.*—An emulsible liquid concentrate was prepared containing 50% of the 2,4-dichlorophenyl ester of benzene sulfonic acid, 47% of a mixture of methylated naphthalenes having a boiling range of 215°–275° C. and 3% of the p-iso-octyl phenyl ether of polyethylene glycol. Two separate spray emulsions were made up, the first containing 1 pint of the concentrate, or ½ pound of toxicant, per 100 gallons of emulsion, and the second containing 1 quart of the concentrate, or 1 pound of toxicant, per 100 gallons. Each of the two sprays was applied to a separate group of McIntosh apple trees for control of European red mite, and average mite counts were obtained at various intervals on 50 leaves selected at random from each tree of each of the two groups of sprayed trees and on 50 leaves selected at random from each tree of a third group of unsprayed trees. The results obtained are tabulated below.

| Treatment | Live mites on 50 leaves after— | | |
|---|---|---|---|
| | 1 day | 3 days | 10 days |
| Spray (1) | 60 | 11 | 19 |
| Spray (2) | 110 | 35 | 11 |
| Control (unsprayed) | 515 | 1,042 | 165 |

Spray emulsion (1) was then applied to Delicious apple trees for control of European red mite with the following results obtained.

| Spray treatment | Live mites on 50 leaves after— | |
|---|---|---|
| | 1 day | 1 week |
| Spray (1) | 139 | 147 |
| Control (unsprayed) | 2,961 | 3,480 |

The above results show the potent effect of the 2,4-dichlorophenyl ester of benzene sulfonic acid against the European red mite infesting apple trees.

*Example 4.*—Two spray dispersions (3) and (4) were made up, each containing proprietary acaricides 1 and 2, respectively. These dispersions were prepared by adding a 50% emulsible liquid concentrate prepared as in Example 1 and containing the respective acaricides as toxicant, to water in an amount of 1 pint of the concentrate, containing ½ pound toxicant, per 100 gallons of dispersion. A spray dispersion (5) containing the 2,4-dichlorophenyl ester of benzene sulfonic acid was then made up by first preparing an impregnated spray powder containing 25% of the toxicant, 72% clay, 2% of a sulfonated naphthalene-formaldehyde spreading agent and 1% of an alkylated aryl polyether alcohol as wetting agent. The spray powder was then added to water in amount of 2 pounds of the powder, containing ½ pound toxicant, per 100 gallons of dispersion.

Each of the three above-mentioned dispersions was first applied to each of three different groups of Delicious apple trees for control of the European red mite with average counts of adult female mites taken on 20 leaves selected at random from each tree of the three groups of trees treated, at various intervals following these spray applications. The spray dispersions were again applied to the respective groups of trees 8 days after the first application. The results of these tests are noted below:

| Spray treatment | Counts of adult female mites on 20 leaves | | |
|---|---|---|---|
| | 4 days after first application | 7 days after first application | 6 days after second application |
| Spray (3) | 148 | 610 | 470 |
| Spray (4) | 139 | 317 | 153 |
| Spray (5) | 65 | 100 | 101 |

It is noted from the table that employing the same concentration of about ½ pound toxicant per 100 gallons of dispersion in each of the three spray dispersions, spray (5) containing the 2,4-dichlorophenyl ester of benzene sulfonic acid as toxicant was superior in effectiveness as compared to either of the two sprays (3) and (4) containing equal quantities of proprietary acaricides 1 and 2.

*Example 5.*—A formulation was prepared containing 1 part by weight of the p-chlorophenyl ester of p-toluene sulfonic acid as active miticidal ingredient, 1 part DDT, 1 part clay, 1/25 part spreading agent and 1/75 part wetting agent. This formulation was added to water using a dosage of 1 pound of the toluene sulfonic acid ester per 100 gallons of suspension. The suspension was sprayed on cranberry bean plants and the results showed excellent kill of adult two-spotted spider mites along with ovicidal activity, whereas the unsprayed check plants showed severe feeding injury.

*Example 6.*—A formulation was made up containing the o-chlorophenyl ester of benzene sulfonic acid as the essential acaricidal ingredient, in a manner similar to that noted in Example 5, and this wettable spray powder formulation was added to water in amount such as to provide 1 pound of the benzene sulfonic acid ester per 100 gallons of suspension. The resulting suspension was sprayed on cranberry bean plants infested with the two-spotted spider mite. Later inspection showed complete kill of all stages of mite growth and no evidence of phytotoxicity.

*Example 7.*—An emulsifiable liquid concentrate solution was prepared consisting of about 33% p-chlorophenyl ester of benzene sulfonic acid, 57% methylated naphthalene solvent and 10% p-isooctyl phenyl ether of polyethylene glycol wetting agent. The concentrate was added to water in an amount of 3 pounds, containing about 1 pound of the benzene sulfonic acid ester toxicant, per 100 gallons of aqueous emulsion, and the resulting emulsion was sprayed on cranberry bean leaves infested with two-spotted spider mites, up to the point of run-off. Seventy-two hours later an 89% kill was observed.

*Example 8.*—A wettable spray powder formulation was prepared similar to that noted in Example 5 above, containing as active acaricidal ingredient the o-chlorophenyl ester of p-toluene sulfonic acid. This formulation was incorporated with water in amount so as to provide 1 pound of the toluene sulfonic acid ester per 100 gallons of suspension, and the resulting suspension sprayed on cranberry bean plants for control of the two-spotted mite. Results showed attractive kill of all stages of mite growth with best effectiveness against adults. Substantially no phytotoxicity was observed.

From the foregoing, it is apparent I have provided a group of compounds and compositions effective as acaricides for the control of mites causing injury to plants and foliage. The most common types of mites which may be destroyed by practicing the principles of the invention include, for example, the two-spotted spider mite (*Tetranychus bimaculatus*), the European red mite (*Paratetranychus pilosus*), the citrus red mite (*Paratetranychus citri*) and the Pacific mite. The toxicants of the invention are of particular value for protecting fruit trees such as apple, pear, peach, plum and citrus trees from the ravages of mites.

Since changes may be made in the invention without departing from the spirit thereof, the invention is to be taken as limited only by the scope of the appended claims.

I claim:

1. An acaricide composition comprising an aqueous dispersion containing an organic solvent of high aromatic content and as the essential active ingredient, a compound of the general formula $RSO_2OR'$, wherein R denotes an aromatic radical free of halogen selected from the group consisting of phenyl and tolyl, and R' denotes chlorinated phenyl.

2. An acaricide composition comprising an aqueous dispersion containing an organic solvent of high aromatic content and as the essential active ingredient, not less than 1/8 lb. per 100 gallons of dispersion, of the 2,4-dichlorophenyl ester of benzene sulfonic acid.

3. The process for controlling mites which comprises subjecting the mites to the action of a compound of the general formula $RSO_2OR'$, wherein R denotes an aromatic radical free of halogen selected from the group consisting of phenyl and tolyl, and R' denotes chlorinated phenyl.

4. The process for controlling mites which comprises applying to plants infested by said mites the 2,4-dichlorophenyl ester of benzene sulfonic acid.

5. The process for controlling mites which comprises applying to plants infested by said mites the p-chlorophenyl ester of p-toluene sulfonic acid.

6. The process for controlling mites which comprises applying to plants infested by said mites the o-chlorophenyl ester of benzene sulfonic acid.

7. The process for controlling mites which comprises applying to plants infested by said mites an aqueous dispersion containing not less than 1/8 lb. per 100 gallons of dispersion, of the 2,4-dichlorophenyl ester of benzene sulfonic acid.

8. The process for controlling mites which comprises applying to plants infested by said mites a composition comprising a solid finely divided diluent and not less than 5% by weight of the 2,4-dichlorophenyl ester of benzene sulfonic acid.

9. An acaricide concentrate composition comprising an organic solution in a solvent of high aromatic content, of a compound of the general formula $RSO_2OR'$, wherein R denotes an aromatic radical free of halogen selected from the group consisting of phenyl and tolyl, and R' denotes chlorinated phenyl, and an emulsifying agent.

10. An acaricide concentrate composition as defined in claim 9 wherein said solvent consists essentially of a mixture of methylated naphthalenes and said solution contains about 30% to 50% of said compound.

11. An acaricide concentrate composition in the form of a wettable powder consisting essentially of a solid diluent, a wetting agent and a compound of the general formula $RSO_2OR'$, wherein R denotes an aromatic radical free of halogen selected from the group consisting of phenyl and tolyl, and R' denotes chlorinated phenyl.

12. An acaricide concentrate composition as defined in claim 11 wherein said solid diluent is clay and said composition contains 10% to 60% by weight of said compound.

13. An acaricide composition comprising an aqueous dispersion of an organic solution containing a mixture of methylated naphthalenes as solvent and as the essential active ingredient, a compound of the general formula $RSO_2OR'$, wherein R denotes an aromatic radical free of halogen selected from the group consisting of phenyl and tolyl, and R' denotes chlorinated phenyl.

14. An acaricide composition comprising an aqueous dispersion of an organic solution containing a mixture of methylated naphthalenes as solvent and as the essential active ingredient, not less than 1/8 lb. per 100 gallons of dispersion, of the 2,4-dichlorophenyl ester of benzene sulfonic acid.

15. An acaricide composition comprising an aqueous dispersion of a wettable powder containing as the essential active ingredient, a compound of the general formula $RSO_2OR'$, wherein R denotes an aromatic radical free of halogen selected from the group consisting of phenyl and tolyl, and R' denotes chlorinated phenyl.

16. An acaricide composition comprising an aqueous dispersion of a wettable powder containing as the essential active ingredient, not less than 1/8 lb. per 100 gallons of dispersion, of the 2,4-dichlorophenyl ester of benzene sulfonic acid.

17. An acaricide composition adapted for use in aqueous dispersion form containing a dispersing agent and as the essential acaricidal ingredient, a compound of the general formula $RSO_2OR'$, wherein R denotes an aromatic radical free of halogen selected from the group consisting of phenyl and tolyl and R' denotes chlorinated phenyl.

EVERETT E. GILBERT.

REFERENCES CITED

The following references are of record in the file of this patent:

UNITED STATES PATENTS

| Number | Name | Date |
|---|---|---|
| 2,148,928 | de Meuron | Feb. 28, 1939 |

OTHER REFERENCES

Lauger et al.: Geigy pamphlet entitled "The Constitution and Toxic Effect of Botanicals and New Synthetic Insecticides" (1945), pages 3 to 42. Translated from the Helvetica Chimica Acta, volume XXVII, Fasciculus Quartus (1944).

Ginsburg et al.: J. Econ. Ent., volume 29 Number 5, October 1936, pages 856 to 859.

Metcalf: J. Econ. Ent., volume 41, Number 6, December 1948, pages 875 to 882.